(12) United States Patent
Jin

(10) Patent No.: US 8,081,647 B2
(45) Date of Patent: Dec. 20, 2011

(54) METHOD AND APPARATUS FOR BUFFERING REQUESTS TO WEB SERVICES USING ANNOTATIONS

(75) Inventor: Lei Jin, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 619 days.

(21) Appl. No.: 11/363,221

(22) Filed: Feb. 27, 2006

(65) Prior Publication Data

US 2007/0204276 A1   Aug. 30, 2007

(51) Int. Cl.
*H04L 12/54* (2006.01)
(52) U.S. Cl. ...................................................... 370/428
(58) Field of Classification Search .......... 719/313–315, 719/328–329; 709/220–226
See application file for complete search history.

(56) References Cited

U.S. PATENT DOCUMENTS

| | | | |
|---|---|---|---|
| 2003/0023957 A1* | 1/2003 | Bau et al. ..................... | 717/140 |
| 2004/0003038 A1* | 1/2004 | Huang et al. .................. | 709/204 |
| 2004/0111701 A1* | 6/2004 | Beust ............................ | 717/108 |
| 2004/0236780 A1* | 11/2004 | Blevins et al. ................ | 707/102 |
| 2005/0021689 A1* | 1/2005 | Marvin et al. ................ | 709/220 |
| 2005/0251574 A1* | 11/2005 | Chagoly et al. .............. | 709/227 |

OTHER PUBLICATIONS

Raalte et al., Oracle Application Server Web Services Developer's Guide, Oracle, Sep. 2003, pp. 7-1 to 7-4.*
"The JMS Control Developer's Guide", Apache Software Foundation, 2004.*

* cited by examiner

*Primary Examiner* — Chirag Shah
*Assistant Examiner* — Jenkey Van
(74) *Attorney, Agent, or Firm* — Fliesler Meyer LLP

(57) ABSTRACT

A system that allows for buffering of requests to web services. In an embodiment, a web service can include at least one annotation indicating that requests to that web service are to be buffered by a queue. A queue name and parameters can be optionally specified in the annotation; otherwise a default queue can be used. A message driven bean or other component can be created and can thereafter supply requests from the queue to the web service.

24 Claims, 2 Drawing Sheets

METHOD AND APPARATUS FOR BUFFERING REQUESTS TO WEB SERVICES USING ANNOTATIONS

FIELD OF INVENTION

The present invention relates to web services.

BACKGROUND OF INVENTION

Web services are a software system designed to support interoperable machine-to-machine interaction over a network. It has an interface that is described in a machine-processable format such as the Web Services Description Language (WSDL). Other systems interact with the Web service in a manner prescribed by its interface using messages, which may be enclosed in a SOAP envelope. These messages can be conveyed using HTTP, and can comprise XML in conjunction with other Web-related standards. Software applications written in various programming languages and running on various platforms can use web services to exchange data over computer networks.

DETAILED DESCRIPTION

Figure 1:
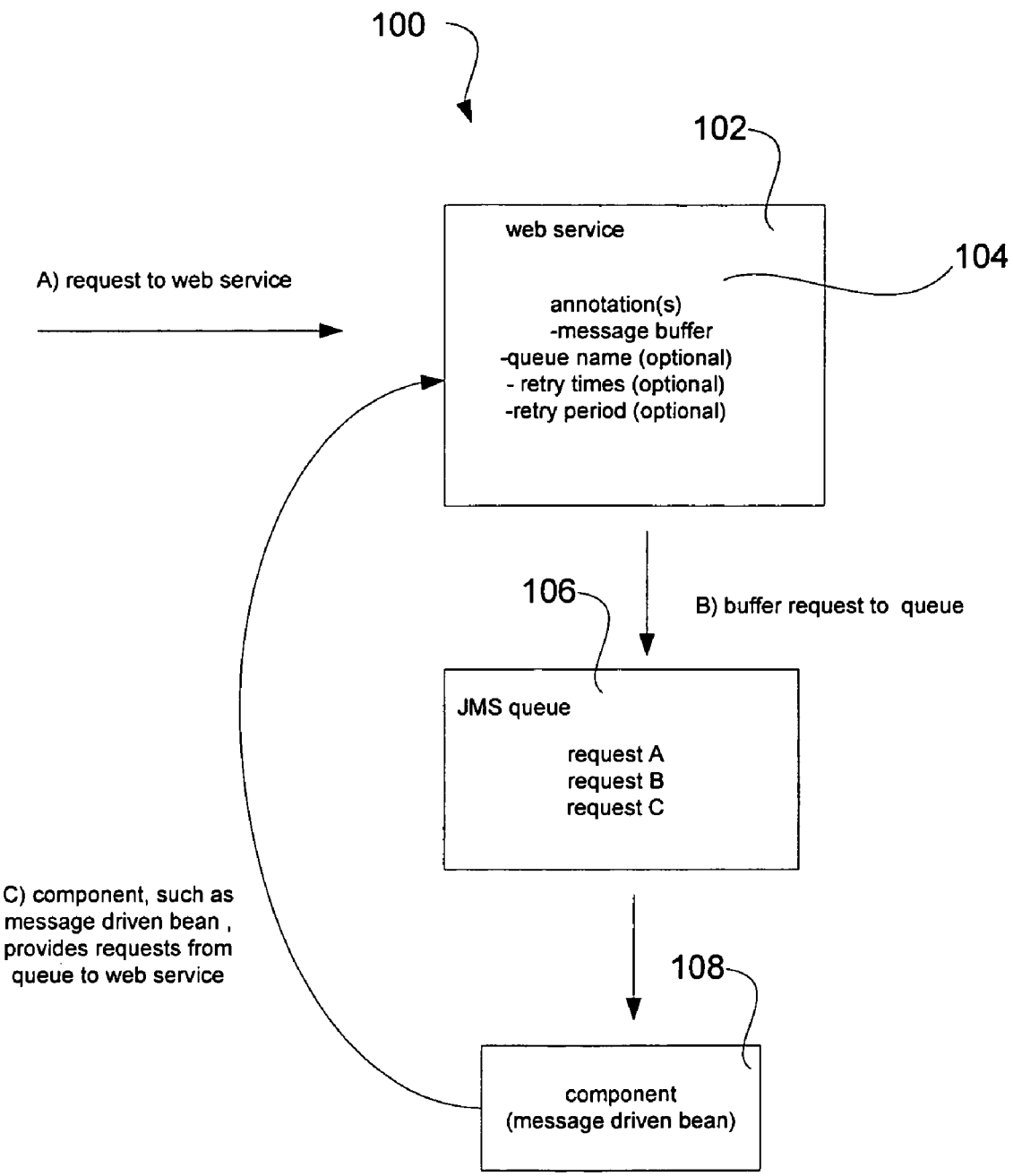
FIG. 1 is a diagram of a system of one embodiment for buffering requests to a web service.

One embodiment of the present invention is a system 100 comprising a web service 102 wherein the web service 102 includes at least one annotation 104 that can indicate that requests are to be buffered. A queue 106 can buffer requests, such as web service invocations, to the web service 102 and a component 108 can supply requests from the queue 106 to the web service 102.

The annotation can be a message buffer annotation. The message buffer annotation can have a format such as "@MessageBuffer". The annotation(s) can optionally include the queue name, retry times indication and/or retry period indication. Default queue name, retry times indication and/or retry period indication can be used if such annotations are not provided.

The queue can be a JMS queue. Java Messaging Service (JMS) is a message oriented system that allows applications to create, send, receive and read messages in a distributed enterprise system. A JMS queue can be identified by a JMS destination. One or more JMS queues can be conformed for each JMS server. The JMS queue can be a distributed queue with multiple queues on multiple machines.

The component 108 can be a Message Driven Bean (MDB). A message-driven bean (MDB) is a special kind of Enterprise Java Bean (EJB) that acts as a message consumer in a JMS messaging system. Message-driven beans can receive messages from a JMS Queue, and perform business logic based on the message contents. EJB deployers can create listeners to a Queue at deployment time, and an application server can automatically create and remove message-driven bean instances as needed to process incoming messages. Because message-driven beans are implemented as EJBs, they benefit from several key services that are not available to standard JMS consumers. Most importantly, message-driven bean instances can be wholly managed by the Application Server EJB container. Using a single message-driven bean class, Application Server can create multiple EJB instances as necessary to process large volumes of messages concurrently.

In one embodiment, an MDB is set up based on the annotation in the web service and instances of the MDB are created when a request is put in the queue. System 100 can interpret at least one annotation and create the component 108. The system 100 can create the component dynamically as the web service is put in the system. An application server (not shown) can host the web service 102, queue 106 and component 108.

In one embodiment, the system 100 can include a web service 102, including at least one annotation 104 indicating that requests are to be buffered, a Java Messaging Service (JMS) queue 106 to buffer requests to the web service 102 and a Message Driven Bean (MDB) 108 to supply requests from the JMS queue 106 to the web service 102.

The web service 102 can have at least one annotation 104 indicating that requests are to be buffered. The at least one annotation 104 can initiate the creation of the component 108 to supply requests from the queue to the web service 102.

FIG. 1 shows a method wherein in Step A, a request is received by a web service 102. The annotation 104 can be used to indicate that requests are to be buffered and initiate the creation of the component 108. In Step B, the system buffers the request into queue 106. This can also create an instance of the component 108. In Step C, the request is sent to the web service 102 when it is available.

Methods of the present invention can allow the system to prevent too many threads of a processing system to run a web service at the same time. Requests can be time shifted using the buffer queue to allow processing resources to not be overtaxed.

Figure 2:
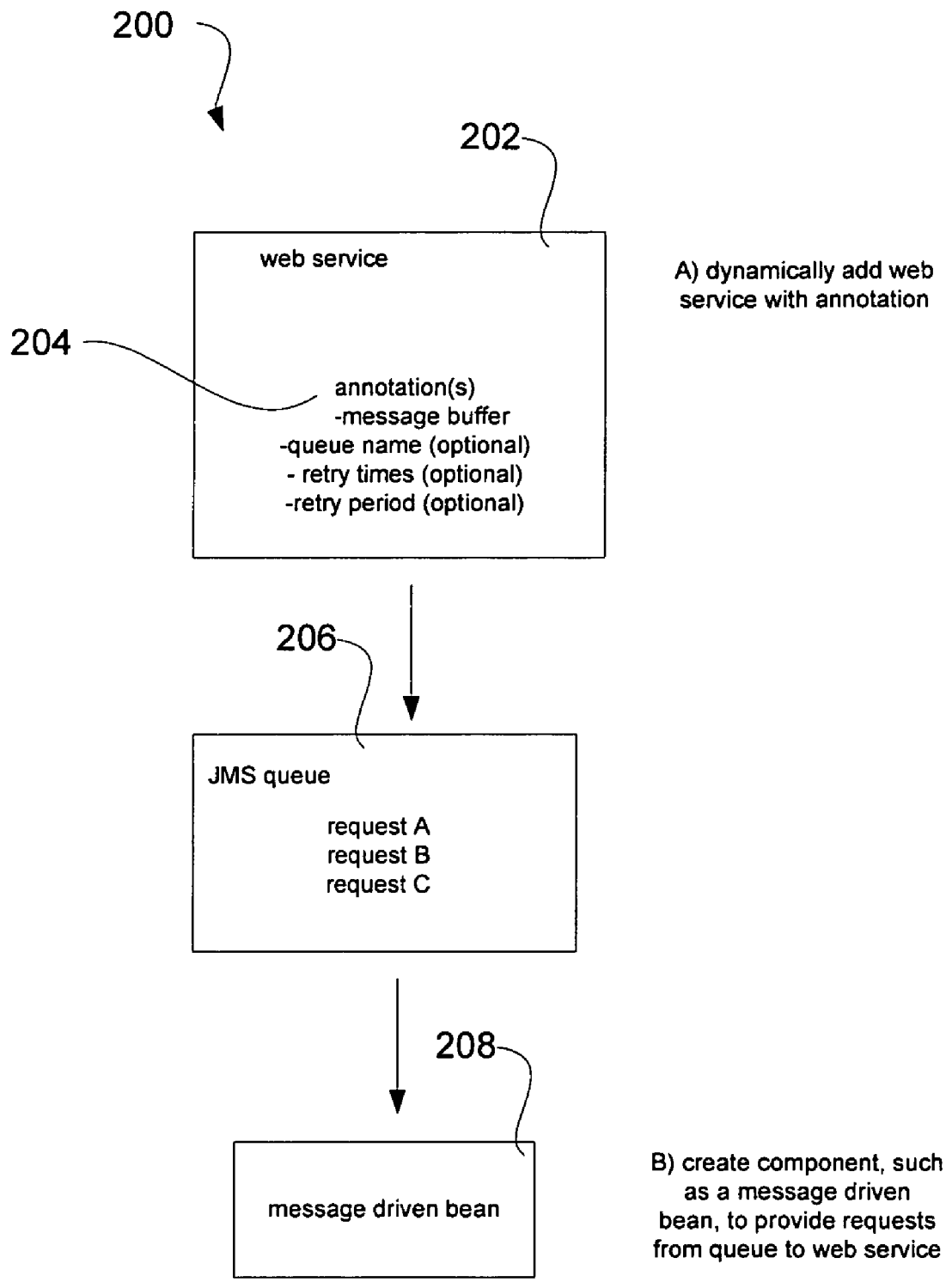
FIG. 2 is a diagram of a system of one embodiment that dynamically creates components for operating the queue based on the annotations of the web service.

FIG. 2 shows a method where in Step A, a web service 202 is added to the system. The system checks the web service 202 for annotations 204. In Step B, the annotations 204 can be used by the system to determine that requests are to be buffered and to create component 208.

In one embodiment, the queue 208 can be created based on the annotation 104.

Looking again at FIG. 1, the queue 106 can be application scoped. In one embodiment, the MDB 108 takes incoming JMS messages off the queue 106, looks at a URI property, and passes it a MessageListener registered with that URI. The MessageListener does the rest. Effectively, the MDBs can act as a MessageListener muxer. A way to go from URI to MessageListener, and from URI to queue. The URI can be used by the MDBs to route buffered messages to the right service. All Web Services can register a single (URI, MessageListener) to handle incoming buffered messages. The application server services can register a second (URI, MessageListener) for container events. This lets different types of services and different subsystems in a service share the same queue and MDB pools without having to agree on a common message format.

Rather than a MDB, the component can be a MessageListener, which reads incoming JMS Messages and performs a regular dispatch into the Web Services stack. The MessageListener can be registered at deployment in the above listed table under the service URI.

An error MessageListener, can read incoming Messages, parse them into SOAP messages, see if there's a FaultTo/ReplyTo/From end point reference, as described in the WS-addressing portocol, then generate and send a fault message indicating that the original message could not be delivered. If there's no FaultTo/ReplyTo/From end point reference, the error can be logged and the message discarded.

A server-side buffering handler can build a JMS Message from an incoming SOAP message, then deposit this on the queue 106 associated with the service for which the handler is registered. The MessageBuffer annotations can be on a class or on a particular method. For example, the handler can look for the MessageBuffer annotations on the JClass to determine whether buffering is required for a particular operation, and what type of retry count/interval is needed.

A server-side deployment listener can add the buffering handler if any of the methods on the service are marked with MessageBuffer.

In one embodiment, client side buffering can come through controls. When a client makes a call to a control method that is buffered, the control implementation can turn around and call ControlContainer.dispatchAsync passing in the id of the control, the java.lang.reflect.Method, and the list of arguments. It can expect the control container implementation to place the request on a queue, then turn around and dispatch it later.

On deployment, every JWS can register a MessageListener and error MessageListener with the BufferManager using a private URI. These MessageListeners can handle buffered control requests and errors resulting from a failure to deliver buffered control requests. The implementation of these MessageListeners is up to the actual JWS container.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nano systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system for using annotations to enable buffering of requests to web services, comprising:
 a computer, including a plurality of web services executing thereon, wherein when each of the web services is deployed to the system, the system registers a listener to receive requests, using a private uniform resource identifier (URI) associated with that web service, and wherein the web service includes at least one annotation associated therewith indicating that requests directed to particular classes or methods of that web service are to be buffered, and wherein the at least one annotation optionally specifies a name of a destination queue that will be used to store buffered requests directed to that web service, prior to delivery of those buffered requests to that web service, and retry parameters to be used with the buffered requests;
 one or more Java Message Service (JMS) queues which can be used to buffer the requests to the web service; and
 a message driven bean (MDB),
  which is set up according to the annotation included with a web service when the web service is deployed to the system, and
  wherein instances of the MDB are subsequently created by the system when the system receives requests directed to the web service, and which are thereafter used to supply the requests from the queue to the web service, when the web service is available;
 wherein, when the system subsequently receives a particular request,
  if the destination queue is named within the annotation, the system places the request into the named queue to be buffered for subsequent retrieval by the MDB, for processing by the plurality of web services, and
  if the destination queue is not named within the annotation, the system places the request into a default queue to be buffered for subsequent retrieval by the MDB, for processing by the plurality of web services, and
  wherein the MDB retrieves the request from the queue, parses the contents of the request to determine registered listeners and private URI properties in the request, and then forwards the request to an appropriate web service that is registered with that URI.

2. The system of claim 1, wherein the system interprets the at least one annotation and creates the MDB.

3. The system of claim 2, wherein the system creates the MDB dynamically as the web service is put in the system.

4. The system of claim 1, further comprising an application server that hosts the web service queue and MDB.

5. The system of claim 1, wherein the at least one annotation is a message buffer annotation.

6. The system of claim 5, wherein the message buffer annotation is on a class level.

7. The system of claim 5, wherein the message buffer annotation is on a particular method.

8. The system of claim 1, wherein the at least one annotation includes the name of the queue.

9. The system of claim 1, wherein the at least one annotation includes a retry times indication.

10. The system of claim 1, wherein the at least one annotation includes a retry period indication.

11. The system of claim 1, wherein the system includes a plurality of web services and MDBs associated therewith, and wherein instances of the message handling components are created when requests to that web service are placed into the queue.

12. The system of claim 1, wherein the one or more queues are application scoped, and wherein each web service has a uniform resource indicator (URI) associated therewith, and wherein the MDB retrieves incoming messages from the queue, determines a URI property in the messages, and passes them to a corresponding message listener registered with that URI.

13. A method of using annotations to enable buffering of requests to web services, comprising:
  parsing by a computer, including a plurality of web services executing thereon, a web service annotation, to determine whether a web service includes at least one annotation indicating that requests directed to particular classes or methods of that web service are to be buffered, wherein when each of the web services is deployed to the system, the system registers a listener to receive requests, using a private uniform resource identifier (URI) associated with that web service, and wherein the at least one annotation optionally specifies a name of a destination queue that will be used to store buffered requests directed to that web service, prior to delivery of those buffered requests to that web service, and retry parameters to be used with the buffered requests;
  determining, by the computer, one or more Java Message Service (JMS) queues which can be used to buffer the requests to the web service;
  initiating a message driven bean (MDB), which is set up according to the annotation included with the web service when the web service is deployed to the system, and wherein instances of the MDB are subsequently created when requests to that web service are first received, and which are thereafter used to supply the requests from the queue to the web service, when the web service is available; and
  upon receiving a particular request,
    if the destination queue is named within the annotation, placing the request into the named queue to be buffered for subsequent retrieval by the MDB, for processing by the plurality of web services, and
    if the destination queue is not named within the annotation, placing the request into a default queue to be buffered for subsequent retrieval by the MDB, for processing by the plurality of web services, and
    wherein the MDB retrieves the request from the queue, parses the contents of the request to determine registered listeners and private URI properties in the request, and then forwards the request to an appropriate web service that is registered with that URI.

14. The method of claim 13, wherein the MDB is set up based on the annotation in the web service, and wherein instances of the MDB are created when a request to that web service is placed into the queue.

15. The method of claim 14, wherein the queue is application scoped and the web service has a uniform resource indicator (URI) associated therewith, and wherein the MDB retrieves incoming JMS messages from the queue, determines a URI property in the messages, and passes them to a corresponding message listener registered with that URI.

16. The method of claim 14, wherein a plurality of web services can be parsed and buffered, and wherein each of the plurality of web services can register a message listener using a unique uniform resource indicator (URI), to handle incoming buffered messages for that web service.

17. A system for using annotations to enable buffering of requests to web services, comprising:
  a computer, which includes a plurality of web services deployed and executing thereon, wherein when each of the web services is deployed to the system, the system registers a listener to receive requests, using a private uniform resource identifier (URI) associated with that web service, and wherein the web service includes an annotation associated therewith which indicates that requests directed to particular classes or methods of that web service are to be buffered, and wherein the annotation optionally specifies
    a name of a destination queue that will be used to store the buffered requests directed to that web service, prior to delivery of the buffered requests to that web service, and
    retry parameters to be used with the buffered requests in delivering the buffered requests to that web service;
  one or more queues which are used to buffer the requests to the web service; and
  a MDB, which is set up according to the annotation included with the web service when the web service is deployed to the system, and wherein instances of the MDB are subsequently created by the system when the system receives requests directed to the web service, and which are thereafter used to supply the requests from the queue to the web service, when the web service is available;
  wherein, when the system subsequently receives a particular request and,
    if the destination queue is named within the annotation, the system places the request into the named queue to be buffered for subsequent retrieval by the MDB, for processing by the plurality of web services, and
    if the destination queue is not named within the annotation, the system places the request into a default queue to be buffered for subsequent retrieval by the MDB, for processing by the plurality of web services, and
    wherein the MDB retrieves the request from the queue, parses the contents of the request to determine registered listeners and private URI properties in the request, and then forwards the request to an appropriate web service that is registered with that URI.

18. The system of claim 17, wherein the system interprets the annotation and creates the Message Driven Bean (MDB).

19. The system of claim 18, wherein the system creates the MDB dynamically when the system receives requests directed to the web service.

20. The system of claim 17, further comprising an application server at the computer, that hosts the web service, destination queue and MDB.

21. The system of claim 17, wherein the annotation is a message buffer annotation, and includes the name of the queue.

22. The system of claim 17, wherein the annotation includes a retry times or period indication.

23. The system of claim 17, wherein the system includes a plurality of web services and MDBs associated therewith, and wherein instances of the MDBs are created when requests to that web service are placed into the queue.

24. The system of claim 23, wherein the one or more queues are application scoped, and wherein each of the plurality of web services has a uniform resource indicator (URI) associated therewith, and wherein the MDB retrieves incoming messages from the queue, determines a URI property in the messages, and passes them to a corresponding message listener registered with that URI.

* * * * *

UNITED STATES PATENT AND TRADEMARK OFFICE
CERTIFICATE OF CORRECTION

| | | |
|---|---|---|
| PATENT NO. | : 8,081,647 B2 | |
| APPLICATION NO. | : 11/363221 | |
| DATED | : December 20, 2011 | |
| INVENTOR(S) | : Jin | |

It is certified that error appears in the above-identified patent and that said Letters Patent is hereby corrected as shown below:

In column 2, line 32, delete "to not be" and insert -- not to be --, therefor.

In column 2, line 64, delete "portocol," and insert -- protocol, --, therefor.

In column 5, line 3, in Claim 11, delete "message handling components" and insert -- MDBs --, therefor.

Signed and Sealed this
Twenty-seventh Day of March, 2012

David J. Kappos
*Director of the United States Patent and Trademark Office*